Jan. 31, 1967  W. H. BACH  3,301,712
BATTERY ADAPTER
Filed Jan. 16, 1964
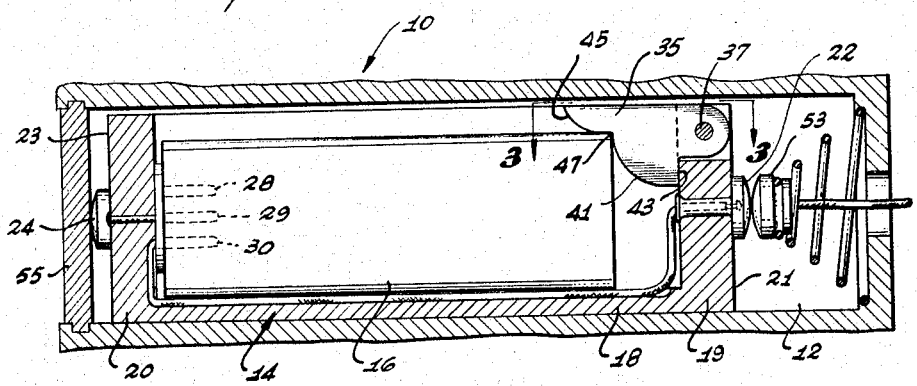
Fig. 1
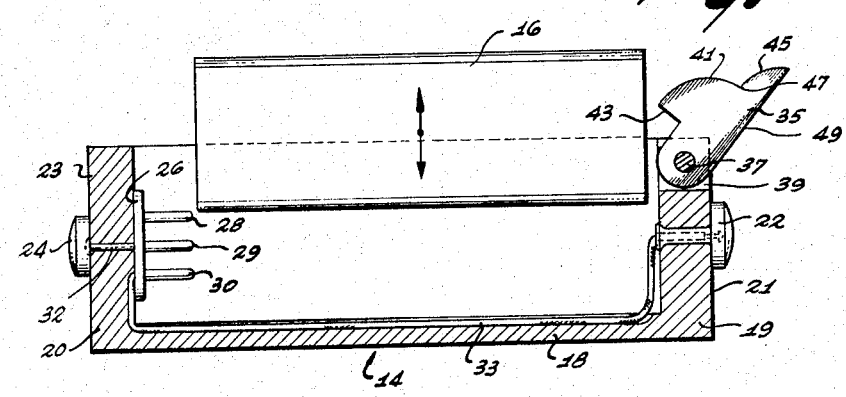
Fig. 2
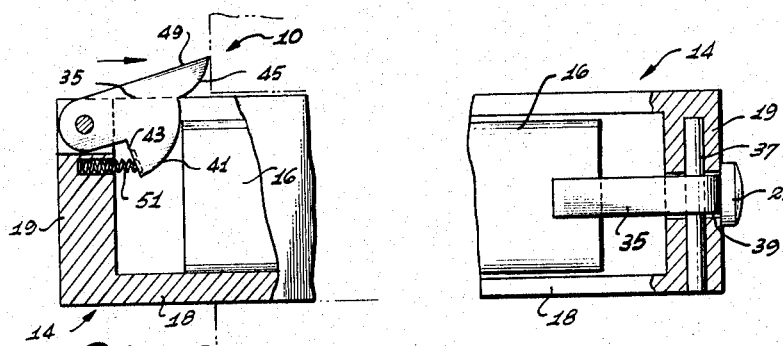
Fig. 3
Fig. 4
INVENTOR.
WALTER H. BACH
BY Fulwider Patton Rieber
Lee, and Utecht
ATTORNEYS

United States Patent Office 3,301,712
Patented Jan. 31, 1967

3,301,712
BATTERY ADAPTER
Walter H. Bach, Los Angeles, Calif., assignor to Bach Auricon, Inc., Los Angeles, Calif., a corporation of California
Filed Jan. 16, 1964, Ser. No. 338,252
6 Claims. (Cl. 136—173)

This invention relates generally to battery adapters, and more particularly to a device for adapting batteries of one physical size and shape for applications intended to make use of batteries of different physical size and shape.

For many years in the electrical arts, it has been a common practice to design portable electrical equipment, e.g., of the video or photographic types, so that such units are capable of battery operation wherever or whenever conventionally generated sources of electrical power are unavailable. Usually, such portable electrical devices include some form of battery receptacle within their construction, the latter receptacle having a physical size and shape conforming to the physical dimensions of the specific battery type which the portable device is designed to utilize. It will be appreciated by those skilled in the art that such an arrangement places rather stringent limitations upon the number of different battery type capable of use with any given piece of equipment, in view of the great diversity and lack of standardization of battery shapes and sizes, even though a great many batteries might otherwise satisfy the voltage and current requirements of the equipment.

A typical example of situations wherein the aforedescribed problem of battery interchangeability may be encountered is in the case of equipment using special purpose batteries designed solely for use with such equipment, such batteries usually being of the rechargeable type. Although such batteries may be capable of use over extended time intervals after each charge, it sometimes happens that the batteries become dissipated at an inconvenient time or place, when a recharger or conventional source of electrical power is not available. Under such conditions, it is desirable to be able to temporarily substitute other types of commonly available batteries for the battery usually used to power the equipment. Hence, those concerned with the development of portable electrical equipment have long recognized the need for a device capable of adapting batteries of one size and shape to applications normally calling for batteries of a different physical size and shape. The present invention fulfills this needs.

An additional problem frequently confronting designers of battery operated equipment has been the prevention of inadvertent reverse polarity installation of batteries in such equipment. Such reverse polarity installation presents an obvious danger of damage to the electrical circuitry supplied by the battery. Moreover, in the case of rechargeable batteries adapted to be recharged while remaining installed within the equipment which they power, reverse polarity charging may not only ruin the battery itself, but is also capable of producing an explosion and, hence, presents an obvious hazard to both equipment and operating personnel.

Accordingly, it is an object of the present invention to provide a battery adapter which overcomes the above and other disadvantages of the prior art.

Another object is to provide a new and useful device for adapting batteries of one size and shape to applications calling for batteries of substantially different physical size and shape.

A further object of this invention is the provision of a relatively simple and economical means for converting equipment designed for use with one type of battery to interchangeable use with other batteries having different physical dimensions but proper electrical characteristics.

Still another object is to provide a new and improved battery adapter which automatically prevents reverse polarity installation of a battery within the device it powers.

The above and other objects and advantages of this invention will become apparent from the following description, when taken in conjunction with the accompanying drawings of illustrative embodiments thereof, and wherein:

FIGURE 1 is a fragmentary sectional view of a portable electrical device having a battery receptable therein, and illustrates a presently preferred embodiment of an installed battery adapter in accordance with the present invention;

FIGURE 2 is a longitudinal sectional view through the battery adapter of FIGURE 1, and illustrates the manner in which the battery is placed within the adapter cradle prior to installation of the adapter into the battery receptacle shown in FIGURE 1;

FIGURE 3 is a fragmentary plan view taken substantially along the line 3—3 in FIGURE 1, portions being broken away in section, and illustrates further details of the battery hold down trigger arrangement; and FIGURE 4 is a fragmentary sectional view of an alternate embodiment of the battery adapter, illustrating the manner in which the battery adapter prevents inadvertent installation of a battery in a reverse polarity position.

Referring now to the drawings, and particularly to FIGURE 1 thereof, there is shown a portion of a portable electrical device 10 having a battery receptacle 12 therein adapted to receive an appropriate battery for providing electrical power for the device. The battery receptacle 12 is generally cylindrical in shape and may have any appropriate transverse cross section, e.g., circular, polygonal or the like, suitable for providing a sliding, but close fit for the battery type with which the device is intended to be used. Hence, the cross section of the battery receptacle 12 is intended to retain a battery in proper coaxial alignment within the battery receptacle in much the same manner as the battery case of a flashlight. In this connection, the length of the battery receptacle must be sufficient to house the battery plus an appropriate electrical contacting arrangement for connecting the battery to its electrical load.

As observed in FIGURE 1, a battery adapter 14, in accordance with the present invention, is installed within the battery receptacle 12. The battery adapter 14 accommodates a battery 16 of smaller physical dimensions than the battery usually used in the device 10, and thereby adapts the smaller battery to the performance of the functions of the larger battery when the latter is unavailable or has become dissipated and cannot be conveniently recharged. Of course, it is to be understood that the substitute battery 16 must be capable of meeting the voltage and current requirements of the electrical load it supplies, although the service life of the substitute battery may vary in duration from that of the battery normally used to power the device 10.

Referring now to FIGURES 1–3, the battery adapter 14 includes a generally cylindrical outer wall 18 terminating in a pair of forward and rear end walls 19, 20, respectively. The exterior shape of the battery adapter 14, as defined by the walls 18–20, conforms to the physical dimensions of the battery normally used to power the electrical device 10. However, one side of the wall 18 is removed to provide an access opening for the insertion of the substitute battery 16, and the interior surface of the battery adapter is shaped to provide a close fit for the substitute battery 16 once it has been installed in the adapter as shown in FIGURE 1. Hence, the interior of the battery adapter 14 functions as a cradle for the smaller substitute battery 16, whereas the outer dimensions of the battery adapter conform to those of the battery for which substitution is to be made.

The walls 18–20 of the battery adapter may be fabricated of any appropriate structural material but preferably are of an electrically insulating material, such as plastic or the like. Where moldable materials are used, the portion of the battery adapter constituting the walls 18–20 may be economically fabricated as a one-piece integral unit.

The forward end wall 19 of the battery adapter 14 supports an electrical contact 22 upon its outer face 21. Similarly, the rear end wall 20 of the battery adapter supports an electrical contact 24 upon its outer face 23. Mounted upon the inner surface of the rear end wall 20, opposite the location of the electrical contact 24, is an electrically insulating mounting plate 26. A plurality of male electrical contact pins 28–30 extend from the mounting plate 26 and are supported thereby so that they project into the cradle area of the battery adapter 14.

As will be observed in FIGURES 1 and 2, the electrical contact pin 29 is electrically connected, via a conductive lead 32, to the electrical contact 24 on the rear wall 20 of the battery adapter. Similarly, the electrical contact pin 30 is connected, via an insulated electrical conductor 33, to the electrical contact 22 on the forward wall 19 of the battery adapter. The contact pin 28, however, is merely a dummy pin included to accommodate the female contact configuration of the particular substitute battery 16 and, hence, the contact pin 28 is not connected to any other electrical contact of the battery adapter 14. It will be apparent, therefore, that the mounting plate 26 may carry any number of mounting pins appropriate to the substitute battery 16, and the invention is not to be considered as limited to the three contact pin configuration shown merely by way of example.

As observed in FIGURE 2, the substitute battery 16 is inserted into the cradle portion of the battery adapter 14 through the access opening in the wall 18. The battery is then shifted along the bottom of the cradle, parallel to the longitudinal axis of the adapter, until the battery is brought into proper mating engagement with the contact pins 28–30 at the rear of the cradle as shown in FIGURE 1. In order to maintain the substitute battery 16 in this properly aligned position, for installation of the battery adapter 14 into the battery receptacle 12 of the device 10, a battery hold down trigger 35 is incorporated into the adapter structure.

As shown in FIGURES 1–3, the battery hold down trigger 35 is pivotally mounted, by a pin 37 passing through one end thereof, within a recess 39 provided for that purpose in the forward wall 19 of the battery adapter, adjacent the access opening in the adapter wall 18. The hold down trigger 35 has a multi-lobe configuration for limiting its range of motion and retaining the battery 16 within the cradle of the battery adapter 14. In this connection, the hold down trigger is provided with a lobe 41 having a first surface 43 adapted to engage the inner surface of the adapter wall 19 when the trigger is pivoted to its battery retaining position shown in FIGURE 1. This cooperation between the wall 19 and lobe surface 43 provides a limit stop for inward movement of the trigger into the cradle compartment of the adapter. The latter feature is desirable to prevent inadvertent damage to the substitute battery 16 due to excessive pressure of the hold down trigger being applied to the battery.

The hold down trigger 35 is also provided with a second lobe 45 intersecting the lobe 41. The intersection 47 between the lobes 41, 45 is adapted to engage an upper edge of the substitute battery 16 subsequent to its installation into the battery adapter 14, so that the substitute battery cannot shift out of engagement with the electrical contact pins 28–30. Hence, the spacing between the intersection 47 of the lobes 41, 45 and the surface 43 of the hold down trigger 35 is equal to the spacing between the installed battery 16 and the inner surface of the forward wall 19 of the battery adapter.

When the substitute battery 16 is inserted into the cradle of the battery adapter as shown in FIGURE 2, and brought into proper engagement with the contact pins 28–30, proper insertion of the battery adapter 14 into the battery receptacle 12 in FIGURE 1 will automatically pivot the hold down trigger 35 from the position of FIGURE 2 to the battery retaining position of FIGURE 1. To this end, the outer exposed peripheral surface 49 of the hold down trigger 35 is adapted to mate in sliding engagement with the inner surface of the battery receptacle 12 when the trigger is in its battery retaining position shown in FIGURE 1.

Referring now particularly to FIGURE 4, it will be observed that, should the battery adapter 14 be turned end for end and inadvertently inserted in a reverse polarity configuration into the battery receptacle 12, the hold down trigger 35 automatically prevents full insertion of the battery adapter into the battery receptacle. In this regard, rather than engaging the outer surface 49 of the hold down trigger 35, and thus forcing the trigger to a battery retaining position, the device 10 encounters the lobe surfaces 41 or 45 of the hold down trigger and tends to drive the trigger further away from the battery retaining position. Hence, full insertion of the battery adapter into the battery receptacle is impossible in the latter instance. If desired, an appropriate spring arrangement 51 may be installed between the wall 19 of the battery adapter and the surface 43 of the hold down trigger 35, to enhance the tendency for the trigger to assume a non-battery retaining position, until a biasing force is applied to the surface 49 of the trigger by proper installation into the battery receptacle in the manner shown in FIGURE 1.

As observed in FIGURE 1, with the battery adapter 14 properly installed within the battery receptacle 12, the forward electrical contact 22 of the adapter is brought into contact with a spring-biased contact 53 appropriately mounted at the innermost end of the battery receptacle. With the battery adapter 14 thus inserted, an appropriate battery receptacle lid 55 is installed over the open end of the battery receptacle, to secure the battery adapter in place. The lid 55 abuts the contact 24 of the battery adapter 14 and, thus, may be fabricated of an electrically conducting material and utilized as an electrical contact, if appropriately grounded. Alternatively, the lid 55 may be fabricated of a non-conducting material and carry an appropriate electrical contact (not shown) upon its inner face, for abutment with the contact 24 of the battery adapter.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:
1. A battery adapter for converting a smaller battery for use as a substitute for a larger battery, comprising:
   a tubular casing having a side wall and a pair of end walls, said side wall having an access opening therein for insertion of a battery into said casing;
   a cradle within said casing defining a mounting compartment for said battery;
   a plurality of external electrical contacts upon said casing;
   a plurality of internal electrical contacts within said cradle electrically connected to said external contacts;
   and a battery hold down trigger pivotally anchored to one of said casing end walls, said trigger having a multi-lobe configuration such that proper polarity insertion of said casing into a battery receptacle moves said trigger to a battery retaining position, while reverse polarity insertion of said casing into a battery receptacle biases said trigger to a non-retaining position and prevents complete insertion of said casing into said receptacle.

2. Apparatus as set forth in claim 1, including means for normally biasing said battery hold down trigger to a non-retaining position.

3. A battery adapter, comprising:
a cylindrical casing having a cradle therein defining a mounting compartment for a battery;
a plurality of external electrical contacts upon said casing;
a plurality of internal electrical contacts electrically connected to said external electrical contacts;
and battery retaining means mounted upon said casing for maintaining a battery within said cradle, said retaining means being movable between battery retaining and non-retaining positions, portions of said battery retaining means projecting beyond the outer periphery of said casing only in non-retaining positions, said retaining means being biased to said battery retaining position only by proper insertion of said casing into a battery receptacle.

4. A device for adapting an electrical power source having one set of physical dimensions as a substitute for an electrical power source having a different set of physical dimensions, comprising:
a hollow cylindrical casing terminating in a pair of forward and rear end walls, said casing having an access opening in one side thereof for insertion of an electrical power source into the interior of said casing;
a cradle within said casing, said cradle defining a mounting compartment for an electrical power source within said casing;
first electrical contact means mounted within said cradle;
second electrical contact means mounted externally upon said casing, said second electrical contact means being electrically connected to said first electrical contact means;
and power source retaining means carried by one of said end walls of said casing for maintaining an electrical power source within said cradle and in engagement with said first electrical contact means, said retaining means being pivotally movable from a power source retaining position to a non-retaining position, portions of said power source retaining means projecting beyond the outer periphery of said casing only in the non-retaining position, the external configuration of said retaining means being such that proper installation of said casing into a close fitting casing receptacle automatically biases said retaining means to its power source retaining position, whereas improper installation into said receptacle biases said retaining means to a non-retaining position and prevents complete insertion of said casing into said close fitting receptacle.

5. Apparatus as set forth in claim 4, including resilient means for normally biasing said power source retaining means to a non-retaining position.

6. A battery adapter, comprising:
a tubular casing having a side wall terminating in a pair of forward and rear end walls, said side wall having an access opening therein for insertion of a battery into the interior of said casing;
a cradle within said casing, said cradle defining a mounting compartment for a battery within said casing;
first electrical contact means mounted externally upon said casing;
second electrical contact means mounted within said cradle;
means for electrically interconnecting said first and said second electrical contact means;
a battery hold down trigger having a multi-lobe configuration and being pivotally anchored to said forward end wall, said trigger being adapted to maintain a battery within said cradle and in engagement with said second electrical contact means, said trigger being movable from a battery retaining position to a non-retaining position, portions of said trigger projecting beyond the outer periphery of said casing only in the non-retaining position, the external configuration of said trigger being such that only proper installation of said casing into a close fitting battery receptacle will automatically bias said trigger to its battery retaining position;
and a spring within said casing for normally biasing said trigger to its non-retaining position.

References Cited by the Examiner

UNITED STATES PATENTS

| | | | |
|---|---|---|---|
| 2,007,203 | 7/1935 | Kraeft | 136—173 |
| 2,449,550 | 9/1948 | Eichberg et al. | 136—173.1 |
| 2,818,463 | 12/1957 | Parker | 136—173 |
| 2,879,316 | 3/1959 | Enikeieff | 136—173 |
| 2,910,580 | 10/1959 | McCleary | 136—173 X |
| 2,951,107 | 8/1960 | Abrams | 136—173 |
| 3,181,974 | 5/1965 | Barbera | 136—173 |

WINSTON A. DOUGLAS, *Primary Examiner.*

D. L. WALTON, *Assistant Examiner.*